Nov. 15, 1955             E. SILVERSTEIN            2,723,465
TESTING AND TRAINING DEVICE FOR
TEACHING READING AND WRITING
Filed May 28, 1951
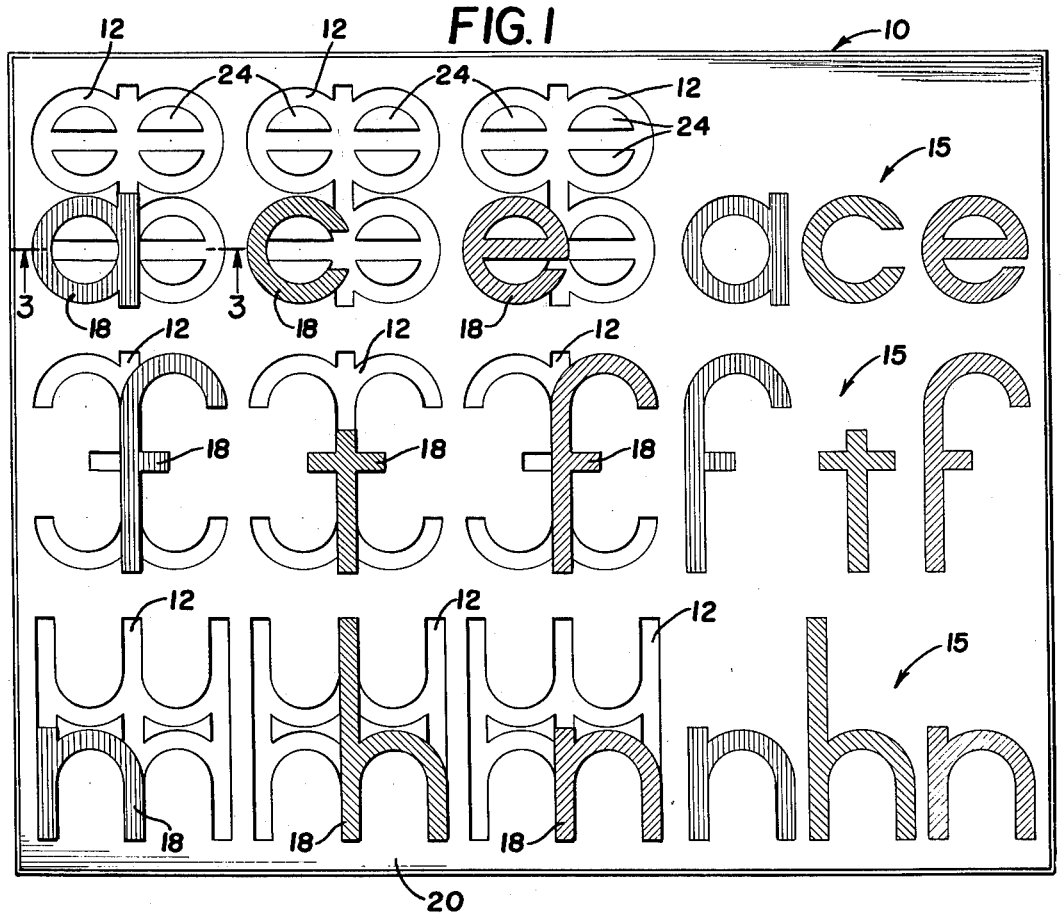
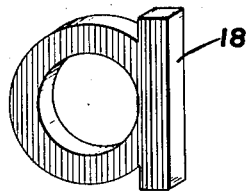
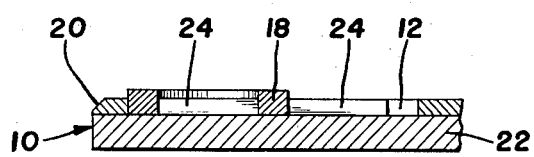
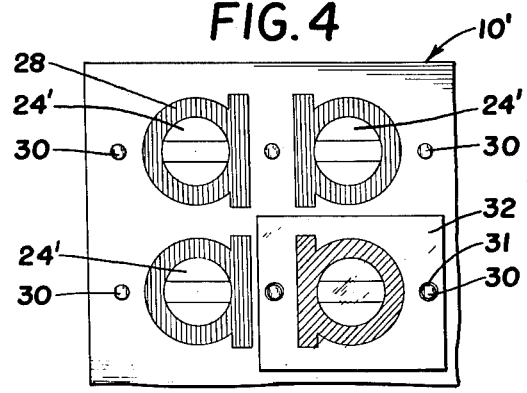
INVENTOR
ESTHER SILVERSTEIN
BY
ATTORNEY

United States Patent Office 2,723,465
Patented Nov. 15, 1955

2,723,465

TESTING AND TRAINING DEVICE FOR TEACHING READING AND WRITING

Esther Silverstein, Terre Haute, Ind.

Application May 28, 1951, Serial No. 228,668

11 Claims. (Cl. 35—35)

This invention relates to educational devices and more particularly to a device for training and/or testing individuals, particularly children who are learning to read and write. In general, an individual learning to read or write must first acquire familiarity with the alphabet and recognition of the various characters therein so as to be able to recognize such characters on paper and properly place them on certain designated lines, right side up and without left to right reversing. It is a well-known fact that children and adults who are learning to read and write will frequently become confused and will write such letters upside down as well as reversing them after the manner of a mirror image. This error may not only occur as a result of improper placing or writing, but may likewise occur as a result of improper seeing or reading of a letter or letters which it is desired to copy. Thus an individual may write the letter "c" reversed in copying the example of a correctly printed letter "c" either because of error in writing the letter or of error in seeing the letter to be copied.

Likewise letters or characters may be written upside down for the same reasons. Accordingly, it is an object of my invention to provide means of a very fundamental nature depicting alphabetical or numerical characters of a standard form which are used in conjunction wtih a guide on which such characters are to be placed, so that selection must be made of the proper placing and orientation of such characters.

It is a further object of my invention to provide a teaching device having a color association scheme to assist in selecting the proper position of a series of characters while an individual undergoing training is attempting to copy an example of the series.

It is a still further object of my invention to provide a testing device whereby the proficiency and the learning progress of an individual may be tested by observing the manner in which he orients the plurality of characters.

My invention is useful in that it effects a rapid and accurate mode of determining reversal or upside down writing and the so-called seeing-reading characteristics and provides thereby an aid to the teacher in the correction of such errors as may occur. The construction of my invention may be exceedingly simple and in its basic concept consists of a series of individual characters preferably of a cut-out type which are to be placed in conforming or matching grooves in a board, following a specific sequence. For example, a sequence of certain alphabetical characters, or numerical characters, graphically presented is given to a person who then proceeds to select the proper cut-out characters corresponding thereto, and to copy the graphic presentation by placing such characters in respective proper positions in matching grooves of the board. The lay-out of the matching grooves is such that a character may be placed in any one of several positions. Further, the grooves on the board are arranged in groups having certain shaped characteristics in common and these groups are associated with cut-out letter groups such that any one of the letters of a particular group may be placed in a wide variety of positions on the board. As the student becomes proficient in the proper recognition of the characters he will ultimately be able to follow a graphic example showing all the characters in one of the aforementioned groups in a particular sequence of shape and color and properly place the cut-out characters in correctly spaced relation and correct orientation in the grooves associated with that particular group.

A detailed description of my invention will now be given in conjunction with the accompanying drawing which:

Fig. 1 represents a plan view of one form of my device;

Fig. 2 shows a perspective view of one of the cut-out characters for use in conjunction with my device;

Fig. 3 is a section through 3—3 of Fig. 1; and

Fig. 4 is a plan view of a modification of my invention.

With reference now to Figs. 1 through 3, my invention comprises a board 10 in which are a plurality of groups of grooves 12 associated with respective graphic representations of certain letter groups 15, as shown. Thus the letter group "a"-"c"-"e" shown uppermost will be seen to have certain shaped characteristics in common in that each letter consists substantially of a small circular body. It will also be noted as indicated by the shadings of these letters that they are printed in different colors. In conjunction with this arrangement there is provided a series of cut-out letters 18 as shown in Fig. 2 which are colored on one side, that is, the obverse side, to match the respective letters of the corresponding group 15. The reverse sides of these letters, however, are differently colored so that if a letter is turned upside down or left to right, it will not match the example to be copied and thus a color association test or training is inherent in the operation of my device.

Upon consideration of the grooves 12 to the left of the graphically presented letters of the group 15, "a," "c" and "e," it will be seen that they consist of three groups each of which consists in turn of certain convolutions such that a letter 18 may be placed in any of the three groups. For example, while the cut-out letter "a" is shown properly placed in Fig. 1, it is apparent that it may have been placed upside down or reversely either in its own group or in any other group of the "a," "c," "e" series.

It will be seen that the letters "a," "c," "e" have been properly placed in the respective matching grooves 12 of Fig. 1 and on the correct line therein; due note being taken of the fact, however, that a variety of positions and combinations are possible although correct observation both as to shape, orientation, and color association on the part of a student will result in proper placement.

It is well to point out at this time that the purpose of providing two lines instead of a single line in which to place the letters is to conform to the conventional type of ruled paper in use in many beginning classes today wherein double-lined paper is used in teaching the reading and writing of upper and lower case letters. Thus it has been found that individuals will sometimes place a letter like "a" on the upper line instead of the lower line and accordingly my invention contemplates detecting such errors.

Referring to Fig. 3, a suggested mode of construction of my device is illustrated wherein the letters are cut through a plate 20 which is then laminated to a base plate 22. Separate pieces such as 24 may then be fastened within the confines of the circular cuts by being glued to the base.

While I have shown for purposes of illustration merely a single set of matching grooves for each of the letters "a," "c," "e," it will be apparent that additional such sets may be provided for the same letters so that a student or pupil will be presented with a problem of placing a plurality of each of these letters in a corresponding plurality of matching grooves. In this manner it can be determined whether a student is consistent in the proper placing or for that matter the improper placing of specific letters so as to rule out the possibility of manipulative carelessness or guesswork.

My invention is carried forward for purpose of illustration herein to the extent of showing a relationship between the letters "f"-"t"-"f" and a series of matching grooves therefor and also for the letters "n"-"h"-"n" and a series of matching grooves therefor, all as clearly shown in Fig. 1.

The mode of usage of the device is the same for these letters as has heretofore been described in connection with the letters "a"-"c"-"e." An inconsistency is shown in the drawing for illustrative purposes in that the letter "h" has been placed in the righthand portion of its respective group, as has the letter "n" following the "h." Thus a spacing error is detectible.

While the exemplary sequences 15 of the letters may be printed directly on board 10, it will be apparent that they may be printed on separate cards and in various combinations of sequence so as to provide means for changing the problem. Further, they may be provided in raised form so that their shape can be felt with the fingertips which in some instances is psychlogically important. Thus, there is a similarity additionally provided in that the example to be copied and the letters to be manipulated will feel the same as to shape when being handled.

In the modification shown in Fig. 4, which contemplates economical production of my invention, there are utilized graphic illustrations 28, rather than grooves, printed on the board 10', a fragmentary portion of the letter group "a"-"c"-"e" being shown. These groups may be printed in some neutral color unlike the colors used for the individual letters to be placed on them. The central portions of the letters such as 24' would, of course, be the same color as the board and merely printed thereon in outline, as shown. Short, upstanding pegs such as 30 may protrude from the board to engage perforations 31 in rectangular pieces of cellophane or Celluloid 32 on which the letters may be individually printed in color. Note that in Fig. 4 the letter "a" is presumed to have been incorrectly placed, it being presented in reversed fashion.

The same size pieces of cellophane or transparent plastic are used for all letters throughout the alphabet so that the spacing of the pegs on the board will be uniform. It will also be noted that some simplification of the matching group has been made in that the various positions of the letter "a" have been separated from each other whereas in the form of Fig. 1 the grooves of the matching groups have certain portions in common, the latter being a preferred form.

The color matching scheme may be carried out for the modification of Fig. 4 as heretofore described in connection with Fig. 1; it being noted that the transparent pieces may be color-printed on both sides or that thin die-cut paper letters may be pasted on such pieces in register with each other, and of different color, so that when any such piece is reversed the reversed letter will be visible.

While I prefer the form of the invention shown in Fig. 1 as being more valuable a teaching aid than that shown in Fig. 4, nevertheless where economy of manufacture is a prime factor or a determining factor, the form of Fig. 4 may be considered.

A further aspect of the form shown in Fig. 4 is that a person may place a letter in upside down or reversed position on some portion of the matching group where there is, in fact, no matching whatsoever. For example, the cellophane piece 32 may have been placed reversed on the correct position for the letter "a" which superimposition would reveal portions of the printed letter "a" through the transparency. This would serve as a further indication of a lack of proficiency.

My invention is not limited in any way by the selection of any particular character or numeral groups, and in fact, could easily be devised to use characters of an extremely elementary form not associated with letters or numbers, but devised merely to train a very poor beginner in the recognition of differences between simple shapes. This aspect and utility of my concept will be apparent to persons skilled in this art and the selection of elementary shapes, silhouettes, etc. can be widely varied as will be apparent.

In the particular illustration given herein I have selected a standard type of manuscript taught in many schools, although it will be apparent that many types of characters in many languages are adaptable for my purposes. Accordingly, I do not seek to be limited to the particular illustration embodied herein except as set forth in the appended claims.

I claim:

1. In a device of the class described, the combination of a plurality of elements depicting unitary alphabetical characters, and a board bearing design means comprising configurations matching the shape of said characters, said configurations being positioned in at least one correct and one incorrect position for each of said characters whereby a person undergoing testing or training may match said individual elements with those on the board and place them in a selected position as determined by the orientation of the matching character configurations thereon.

2. In a device as set forth in claim 1, wherein said elements have obverse and reverse sides and bear colors on their obverse sides differing from the colors on their reverse sides, the colors on said elements also differing as between the several elements when compared with each other, said configurations on said board having colors respectively corresponding, in the correctly oriented portions of said elements, to the colors of the obverse sides of said elements.

3. In a device as set forth in claim 1, wherein the design means on said board comprises a composite and integral configuration having symmetrically shaped portions whereby said individual elements may be matched selectively, correctly or incorrectly, with portions of a predetermined shape.

4. In a combination as set forth in claim 1, wherein said design means comprises grooves provided in the face of said board.

5. In a combination as set forth in claim 1, wherein the design means is graphically depicted on said board.

6. In a combination as set forth in claim 5, including a plurality of pegs or pins protruding from said board and engageable with individual elements.

7. In a combination as set forth in claim 1, wherein said individual elements comprise pieces of transparent material bearing graphic representations of alphabet letters.

8. In a testing and training device, the combination of a plurality of individual elements, each depicting a complete graphic character and having configurations which match each other to a predetermined extent as between separate elements, each of said elements having some configuration peculiar to a specific character, and design means with which said elements may be associated in various matching positions, correct or incorrect, by a person undergoing testing or training, said design means comprising a composite design having configurative portions matching the common configurative portion of said elements and also having portions matching the peculiarities of the configurations of the individual characters depicted by said elements.

9. In a combination as set forth in claim 8, wherein the configurative portions of said design means are substantially symmetrical so as to have left and right-hand portions corresponding to obverse and reverse sides of said elements.

10. A combination as set forth in claim 9, wherein the configuration of said design means has four distinct areas disposed so that an element may be placed thereon above or below a median line, or to the right or left of a line normal to said median line, said median lines thus bisecting the design means vertically and horizontally.

11. A device of the class described comprising a plurality of cut-out alphabet letter elements, said elements being shaped so as to be classified in groups in accordance with configurations common to the shape of the letters of each group, each element having some portion of a shape peculiar to an individual letter and board means comprising a plurality of composite design means, each design means having configurative portions corresponding to the common configurations of respective letter groups and each having portions corresponding to the specific shape peculiarities of individual letters of a respective group, the configurative portions of said design means being disposed in various correct and incorrect positions for association with said letters, whereby said letters may be placed thereon, selectively, in correct or incorrect positions by a person undergoing test or training.

References Cited in the file of this patent

UNITED STATES PATENTS

| | | |
|---|---|---|
| 364,845 | Oakley | June 14, 1887 |
| 556,467 | Koerner | Mar. 17, 1896 |
| 610,628 | Jacobs | Sept. 13, 1898 |
| 713,638 | Hepfinger | Nov. 18, 1902 |
| 777,268 | Thompson | Dec. 13, 1904 |
| 1,245,475 | Lindheim | Nov. 6, 1917 |
| 1,254,028 | Coubal | Jan. 22, 1918 |
| 1,428,456 | Stranders | Sept. 5, 1922 |
| 2,327,471 | Tiers | Aug. 24, 1943 |
| 2,369,804 | Schoolfield et al. | Feb. 20, 1945 |
| 2,415,342 | Donner | Feb. 4, 1947 |

FOREIGN PATENTS

| | | |
|---|---|---|
| 468,055 | Great Britain | Sept. 23, 1935 |
| 603,207 | Great Britain | June 10, 1948 |
| 645,949 | France | July 9, 1928 |
| 694,042 | Great Britain | July 15, 1953 |